United States Patent
Hashida (10) Patent No.: US 10,649,604 B2
(45) Date of Patent: May 12, 2020

(54) INPUT DEVICE MANUFACTURING METHOD

(71) Applicant: Alps Alpine Co., Ltd., Ota-ku, Tokyo (JP)

(72) Inventor: Junji Hashida, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 16/365,385

(22) Filed: Mar. 26, 2019

(65) Prior Publication Data

US 2019/0220119 A1 Jul. 18, 2019

Related U.S. Application Data

(63) Continuation of application No. PCT/JP2017/035892, filed on Oct. 3, 2017.

(30) Foreign Application Priority Data

Oct. 4, 2016 (JP) .................................. 2016-196436

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 2203/04103* (2013.01); *G06F 2203/04112* (2013.01)

(58) Field of Classification Search
CPC ...................... G06F 3/044; G06F 3/041; G06F 2203/04103; G06F 2203/04112
See application file for complete search history.

(56) References Cited

U.S. PATENT DOCUMENTS

2008/0309638 A1 12/2008 Tatehata
2014/0043772 A1* 2/2014 Isoda ...................... H05K 7/00
361/728

FOREIGN PATENT DOCUMENTS

JP 2014-35806 2/2014
JP 2014-170637 9/2014

OTHER PUBLICATIONS

Taiwanese Office Action from Taiwanese Application No. 106126198 dated Jun. 19, 2018.
International Search Report from International Application No. PCT/JP2017/035892 dated Nov. 7, 2017.

* cited by examiner

*Primary Examiner* — Andrew Sasinowski
(74) *Attorney, Agent, or Firm* — Beyer Law Group LLP (57) ABSTRACT

An input device manufacturing method includes: a first process in which, in a state in which a sensor film is inserted into a die, the sensor film having a detection area and a non-detection area other than the detection area, the detection area and the non-detection area constituting the sensor, as well as a first surface formed into a curved surface and a second surface positioned opposite to the first surface, a material that includes a synthetic resin having a translucent property is poured into the die to form a resin layer on the same side as the second surface; and a second process in which a decorative film having a decorative area that covers the non-detection area is pasted to the first surface with an adhesive layer intervening between the decorative film and the first surface.

5 Claims, 10 Drawing Sheets

INPUT DEVICE MANUFACTURING METHOD

CLAIM OF PRIORITY

This application is a Continuation of International Application No. PCT/JP2017/035892 filed on Oct. 3, 2017, which claims benefit of Japanese Patent Application No. 2016-196436 filed on Oct. 4, 2016. The entire contents of each application noted above are hereby incorporated by reference.

BACKGROUND OF THE INVENTION

1. Field of the Invention

The present invention relates to an input device manufacturing method, and more particularly to a method of manufacturing an input device provided with a sensor film having a two-dimensional or three-dimensional curved surface.

2. Description of the Related Art

In various information processing apparatuses, a translucent input device is placed at the front of a display panel such as a color liquid crystal panel. This type of input device is called a touch panel. In a touch panel, a capacitor is formed between electrodes and, when a finger of a person comes close to the touch panel, the coordinates of the close position of the finger are determined from a change in charge movement. To detect this change in charge movement, a capacitive sensor is used.

In recent years, display devices that produce displays on a two-dimensional or three-dimensional curved surface also have appeared. Therefore, touch panels also need to be mounted in a shape that suits this type of curved display surface.

Japanese Unexamined Patent Application Publication No. 2014-35806 discloses a component module manufacturing method. In Japanese Unexamined Patent Application Publication No. 2014-35806, a touch input device is described as a component module. In the touch input device manufacturing method described in Japanese Unexamined Patent Application Publication No. 2014-35806, a touch sensor, an external connection part, and a base are fastened and are then accommodated in space (cavity) formed between a first die and a second die. That is, the touch sensor and external connection part have been already mutually fastened before they are accommodated in the cavity in the dies. In this state, a resin is injected onto a base in the cavity. The touch sensor and external connection part are insert-molded in a resin part formed on the base in this way.

SUMMARY OF THE INVENTION

However, if a laminated body in which a plurality of members in a film or layer shape are laminated is placed in a die and is then insert-molded as in the touch input device manufacturing method described in Japanese Unexamined Patent Application Publication No. 2014-35806, concave and convex parts of the insert-molded member may be transferred to the front surface of the touch input device and may appear. That is, if the laminated body has a step or a difference in the amount of thermal contraction is caused between members during cooling after insert molding, concave and convex parts may appear on the front surface of the touch input device. This is problematic in that the smoothness of the front surface of the touch sensor device is lost.

The present invention provides an input device manufacturing method that can restrain concave and convex parts from appearing on the front surface of an input device and can improve the smoothness of the front surface of the input device.

An input device manufacturing method in the present invention includes: a first process in which, in a state in which a sensor film is inserted into a die, the sensor film having a detection area and a non-detection area other than the detection area, the detection area and the non-detection area constituting the sensor, as well as a first surface formed into a curved surface and a second surface positioned opposite to the first surface, a material that includes a synthetic resin having a translucent property is poured into the die to form a resin layer on the same side as the second surface; and a second process in which a decorative film having a decorative area that covers the non-detection area is pasted to the first surface with an adhesive layer intervening therebetween.

In the input device manufacturing method in the present invention, in the first process, a resin layer is formed, in a state in which a sensor film is inserted into a die, the sensor film having a first surface formed into a curved surface and a second surface positioned opposite to the first surface, on the same side as the second surface by pouring a material that includes a synthetic resin having a translucent property into the die. Then, in the second process, the decorative film having the decorative area that covers the non-detection area of the sensor film is pasted to the first surface with an adhesive layer intervening therebetween. That is, in the input device manufacturing method in the present invention, the sensor film is placed in the die and is insert-molded in the resin layer in a process before the decorative film is pasted to the sensor film. Then, the decorative film is pasted to the first surface of the sensor film, which has been insert-molded in the resin layer with an adhesive layer intervening therebetween.

Thus, in the insert molding of the sensor film, it is possible to mitigate a step formed due to the thickness of the sensor film or a difference in the amount of thermal contraction caused between different members and to have the adhesive layer of the decorative film suppress the step or difference. Therefore, it is possible to restrain concave and convex parts from appearing on the front surface of the input device and thereby to improve the smoothness of the front surface of the input device. Also, the adhesive layer is formed on the same side as the second surface of the sensor film. In other words, since the sensor film is formed on the same side as the front surface of the input device when viewed from the adhesive layer, high detection sensitivity of the input device can be assured. Furthermore, since the sensor film is insert-molded in the adhesive layer, a flexible printed circuit board, wires led to the outside of the detection area, and the like can be buried in the resin layer. Therefore, it is possible to restrain the sensor film from being broken and thereby to improve the reliability of the input device.

In the input device manufacturing method in the present invention, in the first process, the edges of the sensor film may be buried in the resin layer. Thus, since the edges of the sensor film are buried in the resin layer, it is possible to suppress a step formed during the insert molding of the sensor film due to the thickness of the sensor film. Therefore, it is possible to more restrain concave and convex parts from appearing on the front surface of the input device and thereby to more improve the smoothness of the front surface of the input device. Also, since the edges of the sensor film are buried in the resin layer, the sensor film is not provided across the whole of the front surface of the resin layer but is provided only in part of the front surface of the resin layer. That is, the sensor film is partially insert-molded in the resin layer. Therefore, the sensor film can be provided only in the vicinity of an area (specifically, detection area) on which a manipulation can be performed with a manipulation body such as a finger. Thus, the sensor film does not need extend to the portion of a curved surface having a curvature radius (specifically, minimized curvature radius) smaller than the curvature radius of the detection area. Therefore, not only metal nanowires but also indium tin oxide (ITO) materials can be used as the material of the electrode layer of the sensor film. Furthermore, since the sensor film can be provided only in the vicinity of the detection area, it is possible to suppress the size of the sensor film and thereby to increase the number of sensor films that can be taken out (manufactured) in the manufacturing process of the sensor film.

In the input device manufacturing method in the present invention, in the first process, the terminal part of a lead wire provided on the non-detection area may be exposed from a main surface of the resin layer, the main surface being opposite to the sensor film. Thus, the resin layer can have an adequate thickness even at the portion at which the terminal part is exposed. In other words, it is possible to restrain the thickness of the resin layer from being excessively thinned at the portion at which the terminal part is exposed when compared with a case in which a concave part, a recess, or the like used for exposure is formed in the resin layer at the portion at which the terminal part is provided. Thus, the strength of the resin layer can be assured.

In the input device manufacturing method in the present invention, in the second process, a three dimension overlay method (TOM) may be used. Thus, since a three dimension overlay method is used in the second process, it is possible to increase the tight contact of the decorative film with the sensor film, to more restrain concave and convex parts from appearing on the front surface of the input device, and to more improve the smoothness of the front surface of input device.

According to the present invention, it becomes possible to provide an input device manufacturing method that can restrain concave and convex parts from appearing on the front surface of an input device and can thereby improve the smoothness of the front surface of the input device.

DESCRIPTION OF THE PREFERRED EMBODIMENTS

An embodiment of the present invention will be described below with reference the drawings. In the descriptions below, like elements will be denoted by like reference characters and repeated descriptions will be appropriately omitted for members that have been described once.

Figure 1:
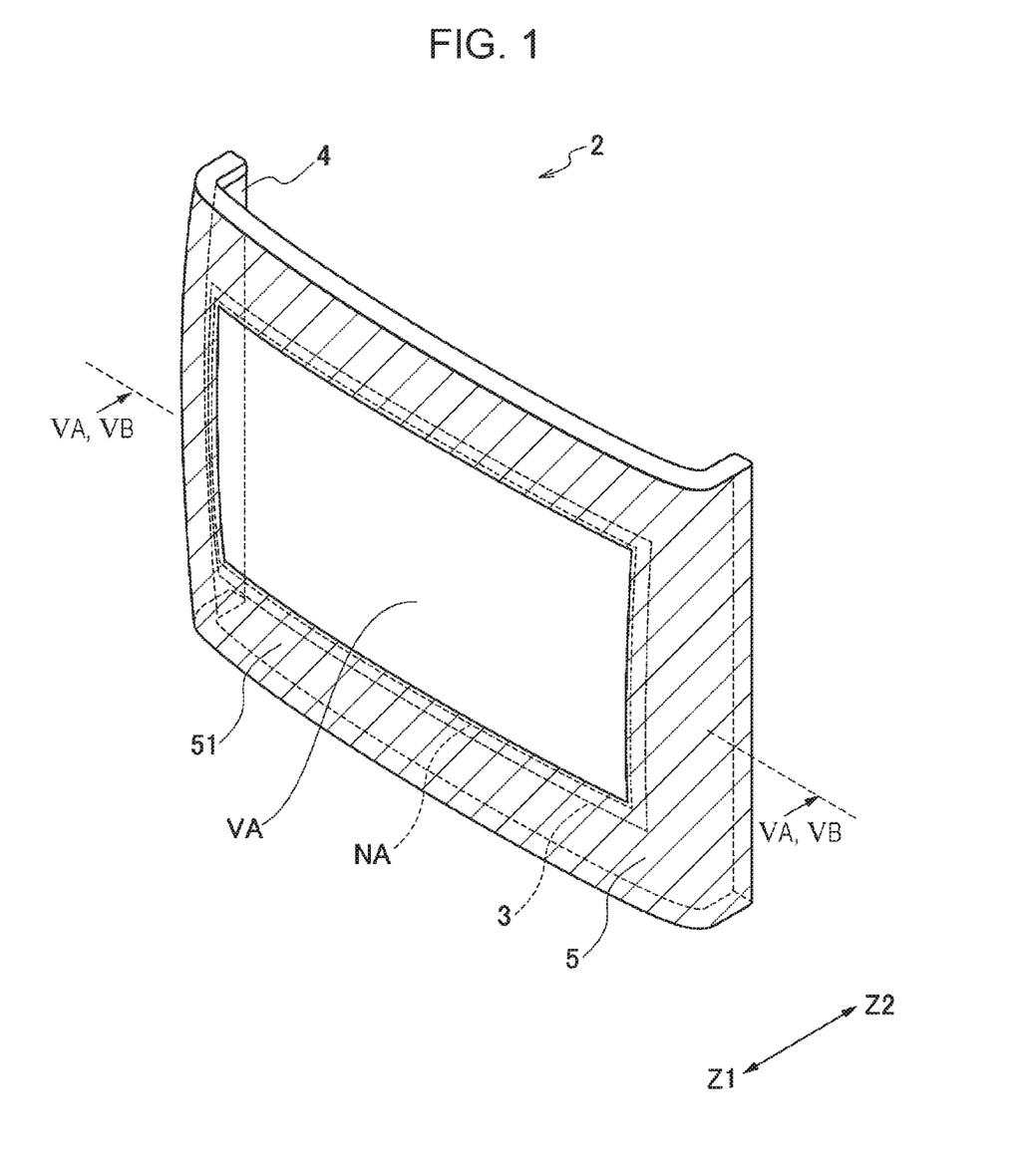
FIG. 1 is a perspective view illustrating an input device manufactured by a manufacturing method according to an embodiment of the present invention.
Figure 2:
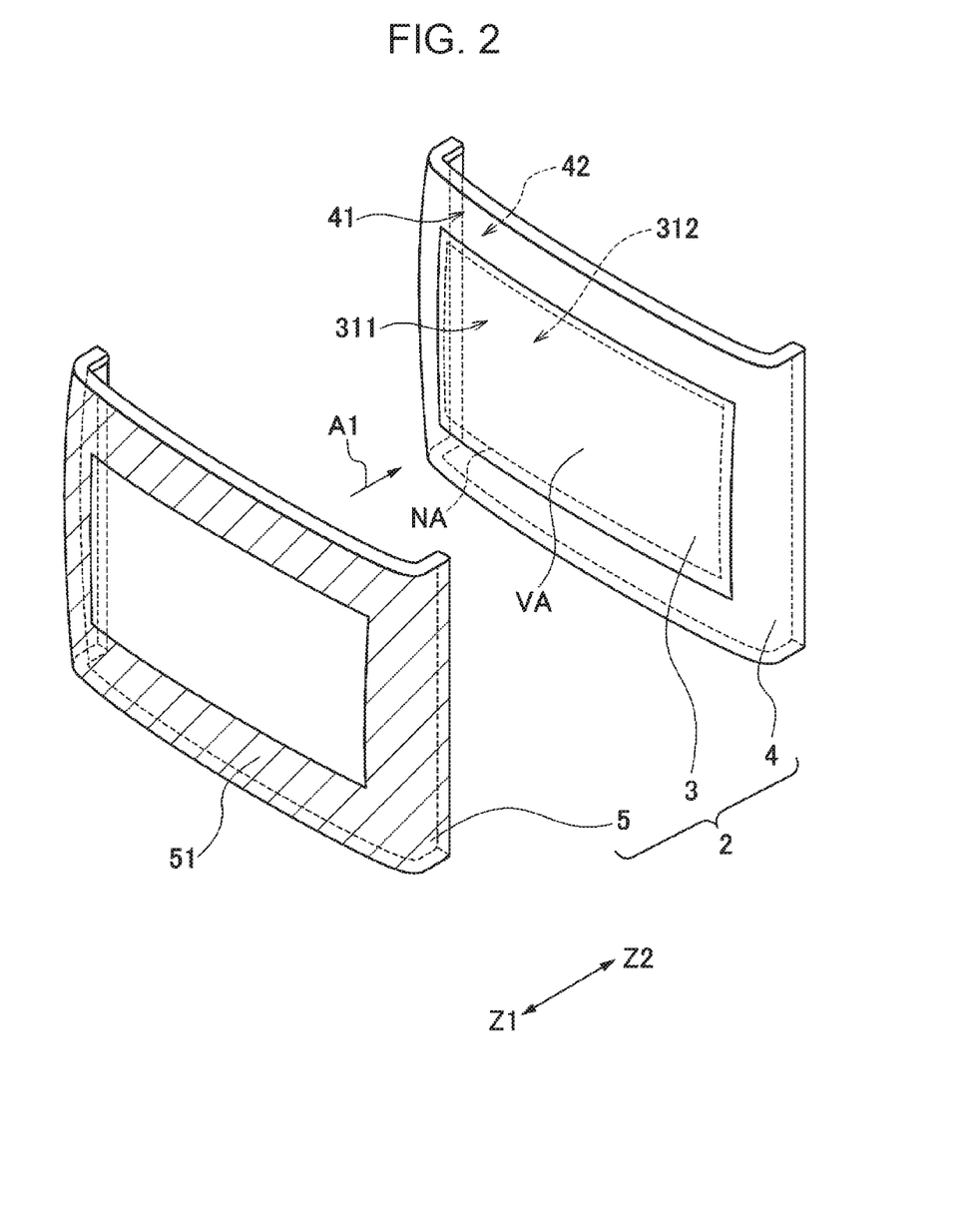
FIG. 2 is an exploded view illustrating the input device manufactured by the manufacturing method according to the embodiment of the present invention.
Figure 3:
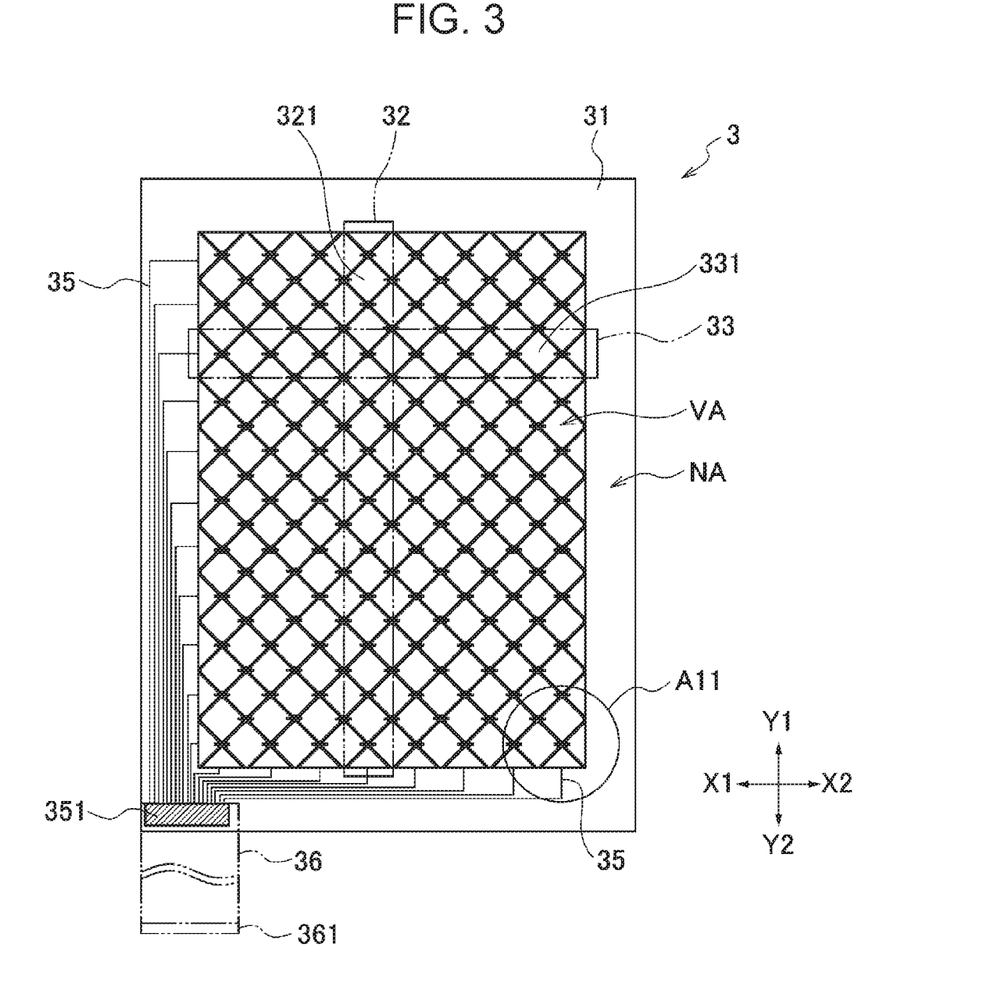
FIG. 3 is a plan view illustrating a sensor film in the embodiment of the present invention.
Figure 4:
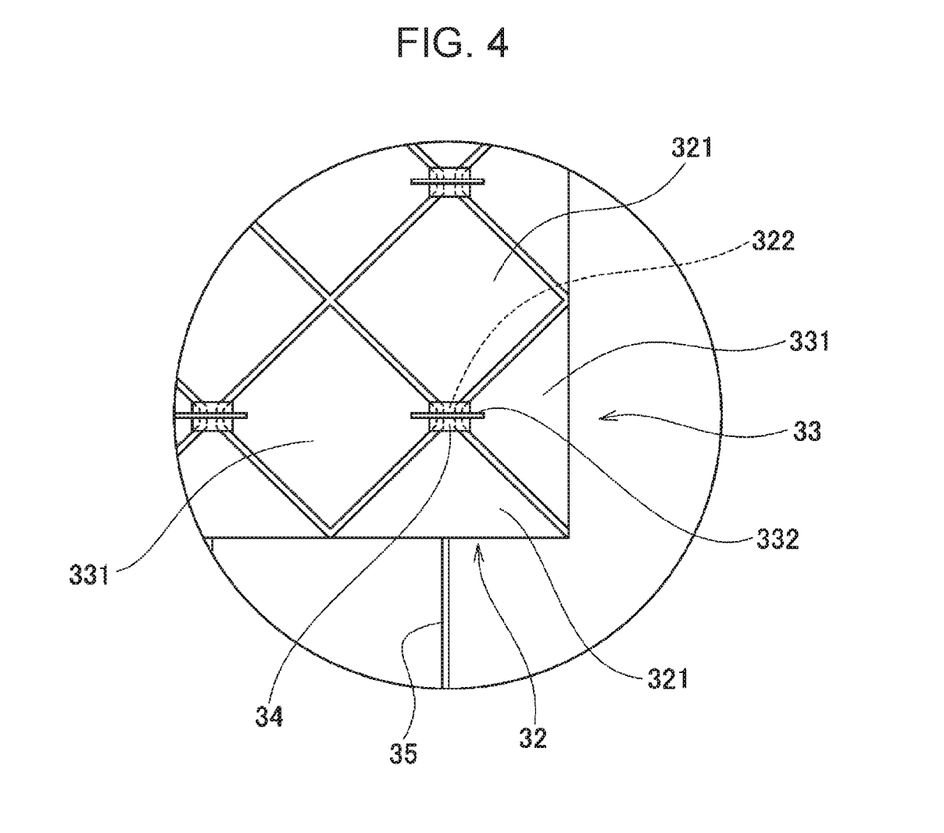
FIG. 4 is an enlarged view in which the area A11 indicated in FIG. 3 is enlarged.

FIG. 1 is a perspective view illustrating an input device manufactured by a manufacturing method according to an embodiment of the present invention. FIG. 2 is an exploded view illustrating the input device manufactured by the manufacturing method according to the embodiment of the present invention. FIG. 3 is a plan view illustrating a sensor film in the embodiment of the present invention. FIG. 4 is an enlarged view in which the area A11 indicated in FIG. 3 is enlarged.

Before an input device manufacturing method according to this embodiment will be described, the input device manufactured by the manufacturing method will be described first. In the specification of this application, "transparency" and "translucent property" indicate a state in which visible light transmittance is 50% or higher (preferably, 80% or higher). Furthermore, it is preferable for the haze value to be 6% or lower. In the specification of this application, "light shielding" and "light shielding property" indicate a state in which visible light transmittance is lower than 50% (preferably, lower than 20%).

As illustrated in FIGS. 1 and 2, the input device 2 is, for example, a touch panel having a curved surface. The input device 2 has a sensor film 3, a molded panel 4, and a decorative film 5. The sensor film 3 is laminated in a state in which it is interposed between the molded panel 4 and the decorative film 5 as indicated by the arrow A1 in FIG. 2, and has electrode layers. For example, the input device 2 detects a contact position by detecting a change in capacitance between a plurality of electrode layers when a finger or the like comes close to the sensor film 3.

As illustrated in FIG. 2, the sensor film 3 has a first surface 311, which is a curved surface. The first surface 311 is, for example, a convex three-dimensional curved surface. In this embodiment, the first surface 311 is a three-dimensional curved surface that is convex in both the vertical direction and the horizontal direction.

The sensor film 3 also has a second surface 312 positioned on the opposite side of the first surface 311. Since the sensor film 3 has a uniform thickness, the second surface 312 is also a three-dimensional curved surface similar to that of the first surface 311. The first surface 311 and second surface 312 may be in another shape; for example, they may be a two-dimensional curved surface or a concave surface. Here, in this embodiment, the normal direction (Z1-Z2 direction) to the curved surface of the first surface 311 will be referred to as the thickness direction or lamination direction.

The sensor film 3 is composed of a detection area VA and a non-detection area NA when viewed from the normal direction (Z1-Z2 direction). The detection area VA is an area forming a sensor and is also an area on which a manipulation can be performed with a manipulation body such as a finger. The non-detection area NA is an area other than the detection area VA. Specifically, the non-detection area NA is an area, shaped like a picture frame, that is positioned on the outer circumference side of the detection area VA. The non-detection area NA is covered with a decorative area 51 on the decorative film 5. The non-detection area NA is light-shielded by a decorative area 51 on the decorative film 5. In the sensor film 3, light (exemplified by external light) propagating from a surface facing the decorative film 5 toward a surface facing the molded panel 4 and light propagating (exemplified by light from a backlight of a display device used in combination with the input device 2) from the surface facing the molded panel 4 toward the surface facing the decorative film 5 are less likely to passes through the non-detection area NA.

As illustrated in FIG. 3, the sensor film 3 has a base material 31. The base material 31 is formed from a transparent base material, which has a translucent property, in a film shape such as polyethylene terephthalate (PET). On one main surface of the base material 31, first electrode links 32 and second electrode links 33 are provided. Each first electrode link 32, which is disposed on the detection area VA, has a plurality of first transparent electrodes 321. The plurality of first transparent electrodes 321 are disposed on the one main surface of the base material 31. As illustrated in FIG. 4, the first transparent electrodes 321 are linked in the Y1-Y2 direction through elongated first linking parts 322. Then, the first electrode links 32, each of which has the plurality of first transparent electrodes 321 linked in the Y1-Y2 direction, are arranged in the X1-X2 direction at intervals. The first linking part 322 is formed integrally with the first transparent electrode 321.

The first transparent electrode 321 and first linking part 322 are formed from a transparent conductive material such as an indium tin oxide (ITO) material by sputtering, evaporation, or the like. Besides the ITO material, transparent conductive materials include metal nanowires typified by silver nanowires, thin metals formed into a mesh shape, conductive polymers, and the like. This is also true for transparent conductive materials described later.

The second electrode links 33 are placed in the detection area VA. Each second electrode link 33 has a plurality of second transparent electrodes 331. The plurality of second transparent electrodes 331 are disposed on the one main surface of the base material 31. Thus, the second transparent electrodes 331 are disposed on the same surface as the first transparent electrodes 321. Each second transparent electrode 331 is linked through an elongated second linking part 332 in the X1-X2 direction. The second electrode links 33, each of which has a plurality of second transparent electrodes 331 linked in the X1-X2 direction, are arranged in the Y1-Y2 direction at intervals. The second linking part 332 is formed separately from the second transparent electrodes 331. The X1-X2 direction crosses the Y1-Y2 direction. For example, the X1-X2 direction perpendicularly crosses the Y1-Y2 direction.

The second transparent electrodes 331 is formed from a transparent conductive material such as an ITO material by sputtering, evaporation, or the like. The second linking part 332 is formed from a transparent conductive material such as an ITO material. Alternatively, the second linking part 332 may have a first layer including a transparent conductive material such as an ITO material and a second layer composed of a metal that has a lower resistance than the first layer and is transparent. If the second linking part 332 has a laminated structure composed of the first layer and second layer, it is preferable for the second layer to be formed from any one selected from a group of Au, an Au alloy, CuNi, and Ni. Of these, selection of Au is more preferable. If the second layer is formed from Au, the second linking part 332 can obtain a superior resistance to an environment (moisture resistance and heat resistance).

As illustrated in FIG. 4, an insulating layer 34 is provided on the front surface of the first linking part 322, which links first transparent electrodes 321. The insulating layer 34 fills space between the first linking part 322 and the second transparent electrodes 331 and also slightly rides on the front surfaces of the second transparent electrodes 331. As the insulating layer 34, a novolak resin (resist), for example, is used.

The second linking part 332 is disposed so as to extend from the front surface of the insulating layer 34 to the front surfaces of the second transparent electrodes 331 positioned on both sides of the insulating layer 34 in the X1-X2 direction. The second linking part 332 electrically connects two adjacent second transparent electrodes 331 to each other.

As illustrated in FIGS. 3 and 4, the insulating layer 34 is disposed on the front surface of the first linking part 322, which links first transparent electrodes 321, and the second linking part 332, which connects individual second transparent electrodes 331, is disposed on the front surface of the insulating layer 34. Thus, the insulating layer 34 is present between the first linking part 322 and the second linking part 332, so the first transparent electrode 321 and second transparent electrodes 331 are electrically insulated from each other. Since, in this embodiment, the first transparent electrode 321 and second transparent electrodes 331 are disposed on the same surface, the sensor film 3 can be thinned.

In the examples of the placement of linking parts illustrated in FIGS. 3 and 4, the first linking part 322 is integrally formed as part of the first transparent electrode 321, and the second linking part 332 is formed on the front surface of the insulating layer 34, which covers the first linking part 322, separately from the second transparent electrodes 331. That is, the second linking part 332 is provided as a bridge wire. However, forms of the placement of individual linking parts are not limited to this. For example, the first linking part 322 may be formed on the front surface of the insulating layer 34 separately from the first transparent electrode 321 and the second linking part 332 may be integrally formed as part of the second transparent electrodes 331. That is, the first linking part 322 may be provided as a bridge wire.

In the non-detection area NA on the sensor film 3, wiring parts 35 are provided. The wiring parts 35 are led out from one end of the first electrode links 32 and one end of the second electrode links 33 to the non-detection area NA. Each wiring part 35 is formed from a material that includes a metal such as Cu, a Cu alloy, a CuNi alloy, Ni, Ag, Au, or the like. The wiring parts 35 are electrically connected to one end of the first electrode links 32 and one end of the second electrode links 33, and are also connected to an external connection part 351, which is electrically connected to a flexible printed circuit board 36. The flexible printed circuit board 36 has a terminal part 361, which is electrically connected to an external device.

The molded panel (resin layer) 4 is provided on the same side as the second surface 312 of the sensor film 3 so as to cover the detection area VA and non-detection area NA. The molded panel 4 is equivalent to the resin layer in the present invention. As illustrated in FIGS. 1 and 2, the sensor film 3 is smaller than the molded panel 4. Specifically, the sensor film 3 is present inside the molded panel 4 and substantially at the center of the molded panel 4 when the input device 2 is viewed toward the lamination direction. In the input device 2 according to this embodiment, however, the sensor film 3 is not limited to a size smaller than the molded panel 4; the sensor film 3 may have the same size as the molded panel 4.

The molded panel 4 is formed by an injection molding method in which a material that has a translucent property and includes a synthetic resin in a molten state, such as polycarbonate or acrylic, is injected into a die. Thus, the sensor film 3 is brought into tight contact with the molded panel 4 and is integrated with the molded panel 4. That is, the sensor film 3 is insert-molded in the molded panel 4. Insert molding will be described later in detail.

The molded panel 4 has a first surface 41, which is a curved surface, as with the sensor film 3. The first surface 41 is, for example, a convex three-dimensional curved surface. The sensor film 3 is disposed on the same side as the first surface 41 of the molded panel 4. A second surface 42 is positioned on the opposite side to the first surface 41 of the molded panel 4. Since the molded panel 4 has a uniform thickness as with the sensor film 3, the second surface 42 is also a three-dimensional curved surface similar to that of the first surface 41. The first surface 41 and second surface 42 may be in another shape; for example, they may be a two-dimensional curved surface or a concave surface.

Figure 5A:
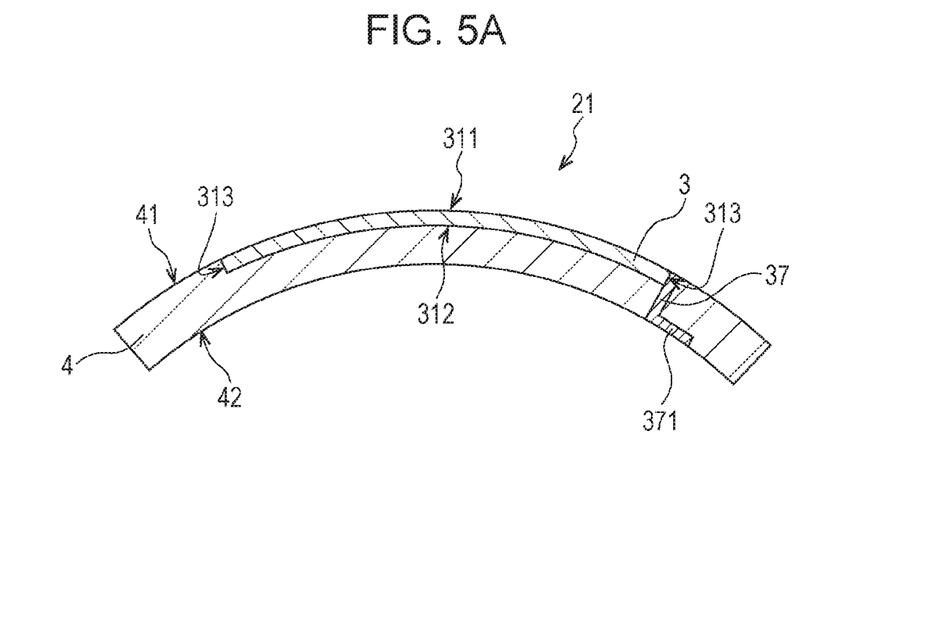
FIGS. 5A and 5B are each a cross-sectional view illustrating the input device manufacturing method according to the embodiment of the present invention.
Figure 5B:
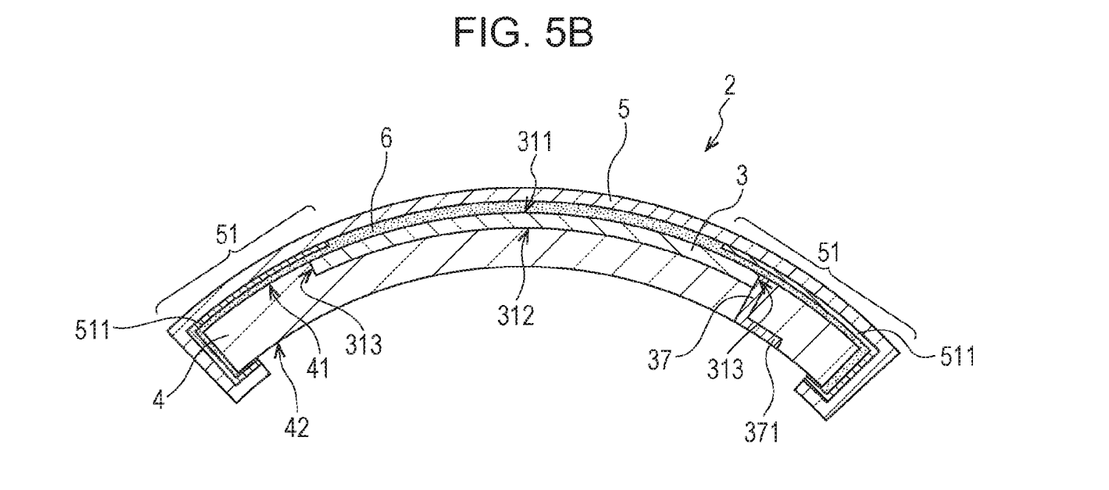

The decorative film 5 is pasted to the first surface 311 of the sensor film 3 and the first surface 41 of the molded panel 4 with an adhesive layer intervening therebetween (see the adhesive layer 6 illustrated in FIGS. 5A and 5B). The decorative film 5 is formed from a transparent base material, which has a translucent property, in a film shape such as polymethyl methacrylate (PMMA), polycarbonate (PC), or polyethylene terephthalate (PET). The decorative film 5 has the decorative area 51, which covers the non-detection area NA on the sensor film 3. On the decorative area 51, a decorative layer (see the decorative layer 511 illustrated in FIGS. 5A and 5B) formed by performing printing or coating with a material having a shielding property is provided. That is, the decorative area 51 is an area on which the decorative layer 511 is formed and corresponds to the non-detection area NA on the sensor film 3. Therefore, the wiring part 35 is behind the decorative area 51 on the decorative film 5 and is not visible when the input device 2 is viewed from the decorative film 5 toward the lamination direction. The decorative layer 511 may be formed by sputtering, evaporation, or the like.

In the input device 2, when a finger used as an example of a manipulation body comes into contact with the front surface of the decorative film 5 corresponding to the detection area VA on the sensor film 3, a capacitance is generated between the finger and the first transparent electrode 321 close to the finger and between the finger and the second transparent electrode 331 close to the finger. The input device 2 can calculate the contact position of the finger according to a change in capacitance at this time. Specifically, the input device 2 detects the X coordinate of the position of the finger according to a change in capacitance between the finger and the first electrode link 32 and detects the Y coordinate of the position of the finger according to a change in capacitance between the finger and the second electrode link 33 (that is, the input device 2 is of self-capacitance detection type).

Alternatively, the input device 2 may be of mutual capacitance detection type. Specifically, the input device 2 may apply a driving voltage to any one of the first electrode link 32 and second electrode link 33, and may detect a change in capacitance between the finger and the other of the first electrode link 32 and the second electrode link 33. Thus, the input device 2 detects the X coordinate of the position of the finger from one electrode link and also detects the Y coordinate of the position of the finger from the other electrode link.

Next, the input device manufacturing method according to this embodiment will be described with reference to the drawings. FIGS. 5A and 5B are each a cross-sectional view illustrating the input device manufacturing method according to this embodiment. FIG. 5A represents a state in which a sensor film 3 has been insert-molded in the molded panel 4. FIG. 5B represents a state in which the decorative film 5 is pasted to the sensor film 3 and molded panel 4. FIGS. 5A and 5B are equivalent to the cross-sectional view taken along line VA,VB-VA,VB in FIG. 1.

First, as illustrated in FIG. 5A, the sensor film 3 is inserted into a die for injection molding, after which a material (specifically, material of the molded panel 4) that includes a synthetic resin having a translucent property in a molten state is poured into the die to form the molded panel 4 on the same side as the second surface 312 of the sensor film 3 (first process). In the first process, the sensor film 3 is brought into tight contact with the molded panel 4 and is integrated with the molded panel 4. That is, the sensor film 3 is insert-molded in the molded panel 4. Thus, a laminated body 21 composed of the sensor film 3 and molded panel 4 is formed by insert molding.

At this time, lead wires 37 provided for the sensor film 3 are buried in the molded panel 4. The lead wire 37 includes the wiring part 35 and flexible printed circuit board 36, which have been described with reference to FIG. 3. That is, the wiring part 35 and flexible printed circuit board 36 are equivalent to the lead wire in the present invention. A terminal part 371 of the lead wire 37 is preferably exposed from the second surface 42 of the molded panel 4. The terminal part 371 of the lead wire 37 includes the external connection part 351 and the terminal part 361 of the flexible printed circuit board 36, which have been described with reference to FIG. 3. That is, the external connection part 351 and terminal part 361 are equivalent to the terminal part of the lead wire in the present invention.

As described above with reference to FIGS. 1 and 2, the sensor film 3 is smaller than molded panel 4. Specifically, the sensor film 3 is present inside the molded panel 4 and substantially at the center of the molded panel 4 when the laminated body 21 is viewed toward the lamination direction. Therefore, when insert molding is performed in the first process, the edges 313 of the sensor film 3 are preferably buried in the molded panel 4 as illustrated in FIG. 5A. The first surface 311 of the sensor film 3 becomes substantially flush with the first surface 41 of the molded panel 4. Thus, a step formed between the first surface 311 of the sensor film 3 and the first surface 41 of the molded panel 4, that is, a step formed due to the thickness of the sensor film 3, can be suppressed.

Next, as illustrated in FIG. 5B, the decorative film 5 is pasted to the first surface 311 of the sensor film 3 and the first surface 41 of the molded panel 4 with the adhesive layer 6 intervening therebetween (second process). The adhesive layer 6 is formed by applying an adhesive such as an acrylic adhesive to the surface, of the decorative film 5, that is to be pasted to the sensor film 3 and molded panel 4. In the first process and second process, the input device 2 is manufactured.

The sensor film 3 may be heated to a predetermined temperature to pre-form the sensor film 3 as a pre-process before the sensor film 3 is inserted into the die for injection molding. That is, as a pre-process before the molded panel 4 is formed, the sensor film 3 may have been shaped so as to have a two-dimensional or three-dimensional curved surface by performing pre-forming for the sensor film 3.

If pre-forming has been performed for the sensor film 3, residual stress generated in the sensor film 3 during insert molding can be mitigated and a higher tight contact force can thereby be obtained at the interface between the sensor film 3 and the molded panel 4. Therefore, it is possible to more restrain the joint between the sensor film 3 and the molded panel 4 from being separated.

In the method, according to this embodiment, of manufacturing the input device 2, the sensor film 3 is insert-molded in the molded panel 4 placed in a die in a process (specifically, first process) before the decorative film 5 is pasted. Then, the decorative film 5 is pasted to the first surface 311 of the sensor film 3, which has been insert-molded in the molded panel 4, with the adhesive layer 6 intervening therebetween.

In the insert molding of the sensor film 3, therefore, it is possible to mitigate a step formed due to the thickness of the sensor film 3 or a difference in the amount of thermal contraction caused between the sensor film 3 and the molded panel 4 and to have the adhesive layer 6 of the decorative film 5 suppress the step or difference. Therefore, it is possible to restrain concave and convex parts from appearing on the front surface of the input device 2 and thereby to improve the smoothness of the front surface of the input device 2. Also, the molded panel 4 is formed on the same side as the second surface 312 of the sensor film 3. In other words, since the sensor film 3 is formed on the front surface (specifically, manipulation surface) side of the input device 2 when viewed from the molded panel 4, high detection sensitivity of the input device 2 can be assured. Furthermore, since the sensor film 3 is insert-molded in the molded panel 4, the lead wire 37 can be buried in the molded panel 4. This makes it possible to restrain the lead wire 37 from being broken and thereby to improve the reliability of the input device 2.

Also, since the edges 313 of the sensor film 3 are buried in the molded panel 4, it is possible to suppress a step formed during the insert molding of the sensor film 3 due to the thickness of the sensor film 3. Therefore, it is possible to more restrain concave and convex parts from appearing on the front surface of the input device 2 and thereby to more improve the smoothness of the front surface of the input device 2. Also, since the edges 313 of the sensor film 3 are buried in the molded panel 4 as described above, the sensor film 3 is not provided across the whole of the first surface 41 of the molded panel 4 but is provided only in part of the first surface 41 of the molded panel 4. That is, the sensor film 3 is partially insert-molded in the molded panel 4. Therefore, the sensor film 3 can be provided only in the vicinity of an area (specifically, detection area VA) on which a manipulation can be performed with a manipulation body such as a finger. Thus, the sensor film 3 does not need to extend to the portion of a curved surface having a curvature radius (specifically, minimized curvature radius) smaller than the curvature radius of the detection area VA. Therefore, not only metal nanowires but also ITO materials can be used as the materials of the first transparent electrode 321 and second transparent electrodes 331. Furthermore, since the sensor film 3 can be provided only in the vicinity of the detection area VA, it is possible to suppress the size of the sensor film 3 and thereby to increase the number of sensor films 3 that can be taken out (manufactured) in the manufacturing process of the sensor film 3.

Furthermore, the terminal part 371 of the lead wire 37 is exposed from the second surface 42 of the molded panel 4, the molded panel 4 can have an adequate thickness even at the portion at which the terminal part 371 is exposed. In other words, it is possible to restrain the thickness of the molded panel 4 from being excessively thinned at the portion at which the terminal part 371 is exposed when compared with a case in which a concave part, a recess, or the like used for exposure is formed in the molded panel 4 at the portion at which the terminal part 371 is provided. Thus, the strength of the molded panel 4 can be assured.

Figure 6A:
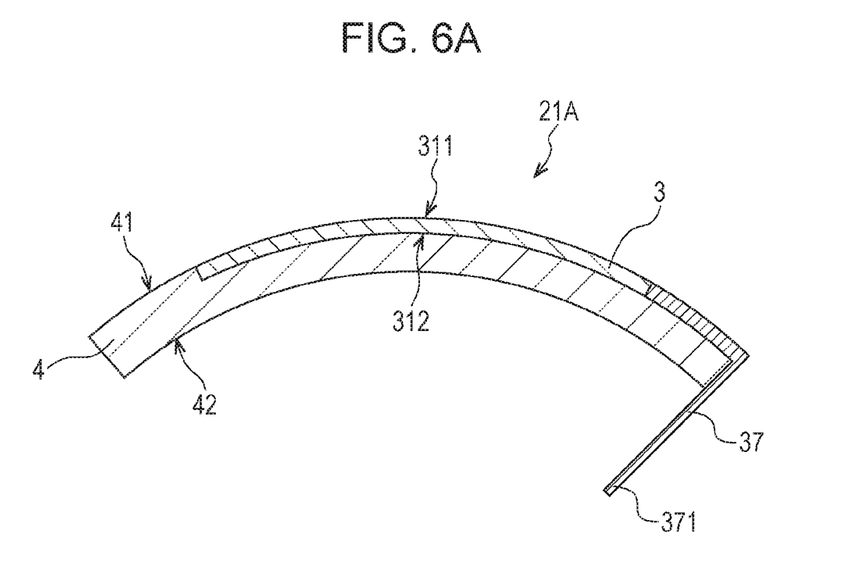
FIGS. 6A and 6B are each a cross-sectional view illustrating an input device manufacturing method according to a first variation of the embodiment of the present invention.
Figure 6B:
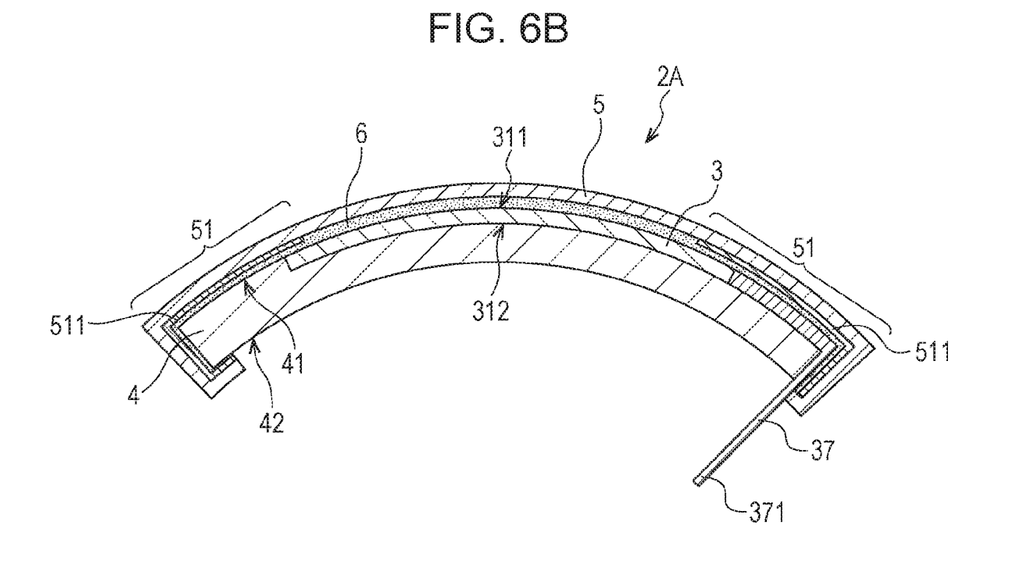

FIGS. 6A and 6B are each a cross-sectional view illustrating an input device manufacturing method according to a first variation of this embodiment. FIG. 6A represents a state in which the sensor film 3 has been insert-molded in the molded panel 4. FIG. 6B represents a state in which the decorative film 5 is pasted to the sensor film 3 and molded panel 4. FIGS. 6A and 6B are equivalent to the cross-sectional view taken along line VA,VB-VA,VB in FIG. 1.

In this variation, as illustrated in FIG. 6A, the lead wire 37 extends from the sensor film 3 along the first surface 41 of the molded panel 4, passes through the side surface of the molded panel 4, and is lead to the second surface 42 of the molded panel 4 in a process (specifically, first process) in which the sensor film 3 is insert-molded in the molded panel 4. Then, the terminal part 371 of the lead wire 37 protrudes from the second surface 42 of the molded panel 4. A laminated body 21A in this variation is formed by insert molding in this way. In this point, the method, in this variation, of manufacturing the input device 2A differs from the method, described above with reference to FIGS. 5A and 5B, of manufacturing the input device 2.

Next, the decorative film 5 is pasted to the first surface 311 of the sensor film 3 and first surface 41 of the molded panel 4 with the adhesive layer 6 intervening therebetween as illustrated in FIG. 6B (second process). In the first process and second process, the input device 2A in this variation is manufactured.

In the method, according to this variation, of manufacturing the input device 2A, the lead wire 37 can be interposed between a side surface of the molded panel 4 and the decorative film 5. Therefore, it is possible to restrain the lead wire 37 from being broken and thereby to improve the reliability of the input device 2. Since the terminal part 371 of the lead wire 37 protrudes from the second surface 42 of the molded panel 4, the molded panel 4 can have an adequate thickness even at the portion at which the terminal part 371 protrudes and the strength of the molded panel 4 can be assured. Also, an effect similar to the effect described above with reference to FIGS. 5A and 5B can be obtained.

Figure 7A:
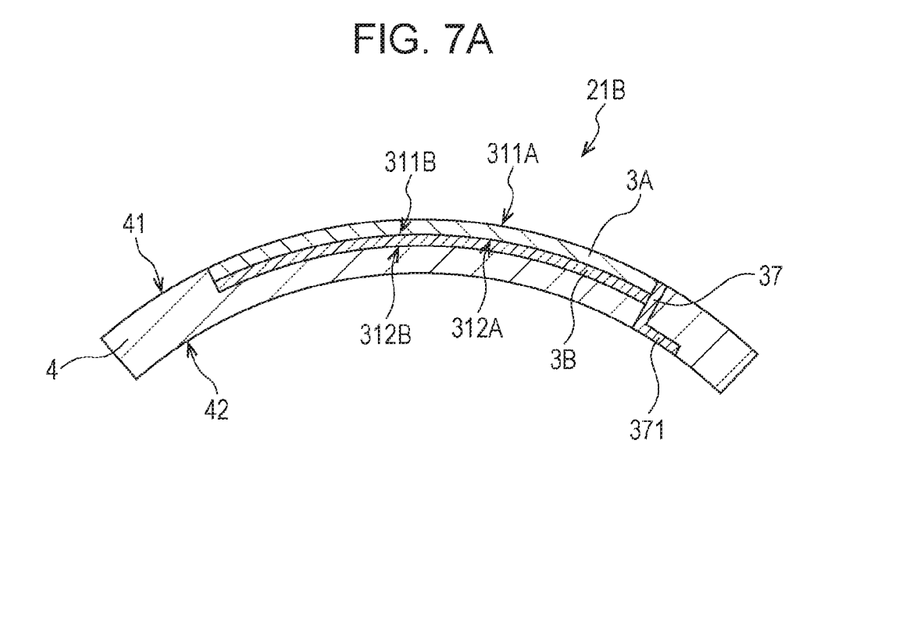
FIGS. 7A and 7B are each a cross-sectional view illustrating an input device manufacturing method according to a second variation of the embodiment of the present invention.
Figure 7B:
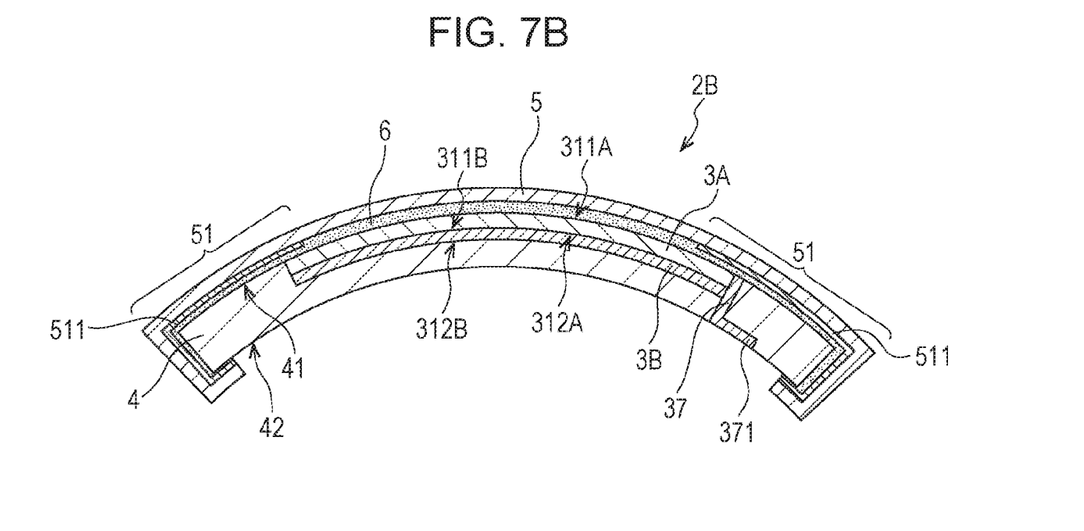

FIGS. 7A and 7B are each a cross-sectional view illustrating an input device manufacturing method according to a second variation of this embodiment. FIG. 7A represents a state in which the sensor film 3 has been insert-molded in the molded panel 4. FIG. 7B represents a state in which the decorative film 5 is pasted to the sensor film 3 and molded panel 4. FIGS. 7A and B are equivalent to the cross-sectional view taken along line VA,VB-VA,VB in FIG. 1.

In this variation, as illustrated in FIG. 7A, a first sensor film 3A and a second sensor film 3B are inserted into a die for injection molding. For example, the first sensor film 3A and second sensor film 3B are placed in the die for injection molding so that the second surface 312A of the first sensor film 3A faces the first surface 311B of the second sensor film 3B, as illustrated in FIG. 7A. Next, a material (specifically, material of the molded panel 4) that includes a synthetic resin having a translucent property in a molten state is poured into the die to form the molded panel 4 on the same side as the second surface 312B of the second sensor film 3B (first process). A laminated body 21B in this variation is formed by insert-molding in this way. The method, according to this variation, of manufacturing the input device 2B differs from the method, described above in relation to FIGS. 5A and 5B, of manufacturing the input device 2 in that two sensor films (first sensor film 3A and second sensor film 3B) are inserted into a die for injection molding.

Next, as illustrated in FIG. 7B, the decorative film 5 is pasted to the first surface 311A of the first sensor film 3A and the first surface 41 of the molded panel 4 with the adhesive layer 6 intervening therebetween (second process). In the first process and second process, the input device 2B in this variation is manufactured.

In the method, according to this variation, of manufacturing the input device 2B, even if two sensor films (first sensor film 3A and second sensor film 3B) are insert-molded in the molded panel 4, it is possible to restrain concave and convex parts from appearing on the front surface of the input device 2B and thereby to improve the smoothness of the front surface of the input device 2B. Also, since two sensor films (first sensor film 3A and second sensor film 3B) are provided, the input device 2B in this variation can function as a mutual capacitance detection type of capacitive sensor. That is, the input device 2B applies a voltage to any one of the first sensor film 3A and second sensor film 3B and detects a change in capacitance between the finger and the other of the first sensor film 3A and second sensor film 3B. Therefore, the input device 2B detects the X coordinate of the position of the finger with one sensor film and detects the Y coordinate of the position of the finger with the other sensor film. Also, an effect similar to the effect described above with reference to FIGS. 5A and 5B can be obtained.

In this variation, a case in which a laminated body in which a plurality of films are laminated has two sensor films has been described as an example. However, the laminated film is not limited to this, but may have one sensor film and one functional film (for example, a high retardation film). Alternatively, the laminated film may have two or more sensor films and one or more functional films that are further laminated on the sensor films. That is, films are not limited sensor films and there is no particular limitation on the number of laminated films. A step caused by the thickness of all laminated films is suppressed by insert molding in the first process.

Figure 8A:
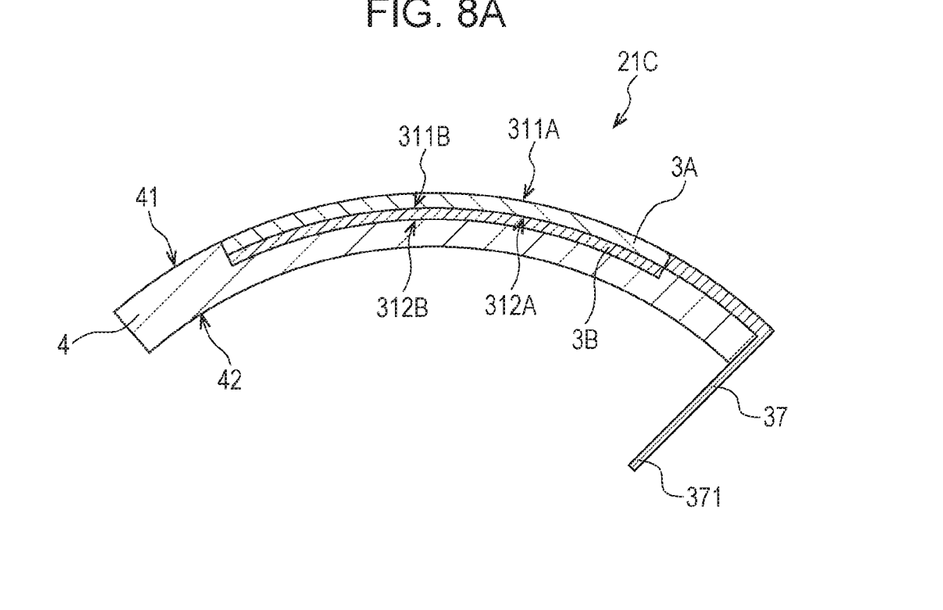
FIGS. 8A and 8B are each a cross-sectional view illustrating an input device manufacturing method according to a third variation of the embodiment of the present invention.
Figure 8B:
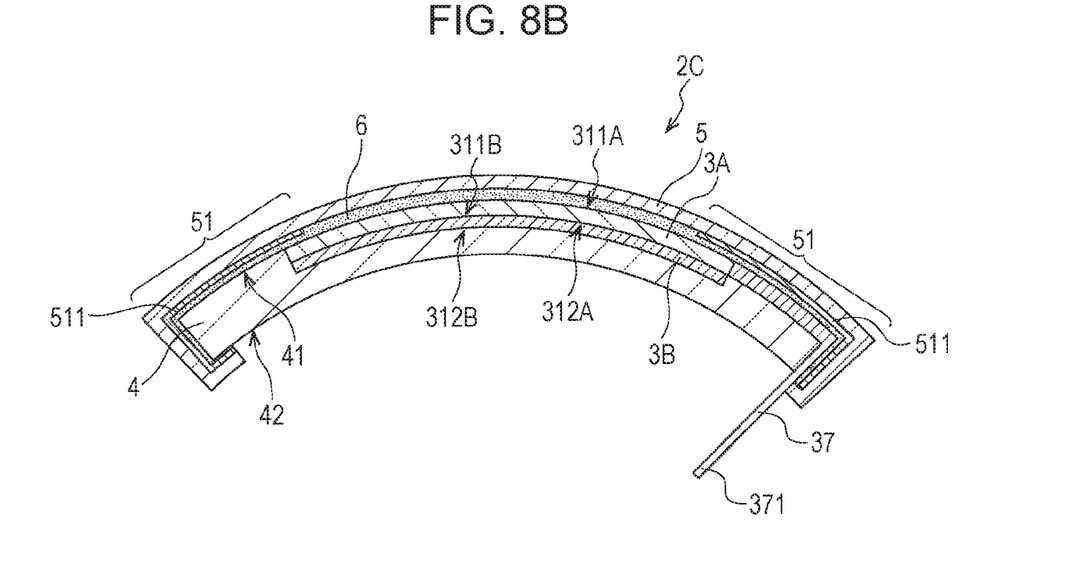

FIGS. 8A and 8B are each a cross-sectional view illustrating an input device manufacturing method according to a third variation of this embodiment. FIG. 8A represents a state in which the sensor film 3 has been insert-molded in the molded panel 4. FIG. 8B represents a state in which the decorative film 5 is pasted to the sensor film 3 and molded panel 4. FIGS. 8A and 8B are equivalent to the cross-sectional view taken along line VA,VB-VA,VB in FIG. 1.

In this variation, as illustrated in FIG. 8A, a first sensor film 3A and a second sensor film 3B are inserted into a die for injection molding. For example, the first sensor film 3A and second sensor film 3B are placed in the die for injection molding so that the second surface 312A of the first sensor film 3A faces the first surface 311B of the second sensor film 3B, as illustrated in FIG. 8A. Next, a material (specifically, material of the molded panel 4) that includes a synthetic resin having a translucent property in a molten state is poured into the die to form the molded panel 4 on the same side as the second surface 312B of the second sensor film 3B (first process). In the first process, the lead wire 37 extends from the first sensor film 3A and second sensor film 3B along the first surface 41 of the molded panel 4, passes through the side surface of the molded panel 4, and is lead to the second surface 42 of the molded panel 4 in the first process. Then, the terminal part 371 of the lead wire 37 protrudes from the second surface 42 of the molded panel 4. A laminated body 21C in this variation is formed by insert-molding in this way. That is, this variation is a manufacturing method in which the first variation described above with reference to FIGS. 6A and 6B and the second variation described above with reference to FIGS. 7A and 7B are combined.

Next, as illustrated in FIG. 8B, the decorative film 5 is pasted to the first surface 311A of the first sensor film 3A and the first surface 41 of the molded panel 4 with the adhesive layer 6 intervening therebetween (second process). In the first process and second process, the input device 2C in this variation is manufactured.

In the method, according to this variation, of manufacturing the input device 2C, an effect similar to the effect in the first variation described above with reference to FIGS. 6A and 6B and the effect in the second variation described above with reference to FIGS. 7A and 7B can be obtained. As in the second variation described above with reference to FIGS. 7A and 7B, films are not limited sensor films and there is no particular limitation on the number of laminated films. A step caused by the thickness of all laminated films is suppressed by insert molding in the first process.

Figure 9A:
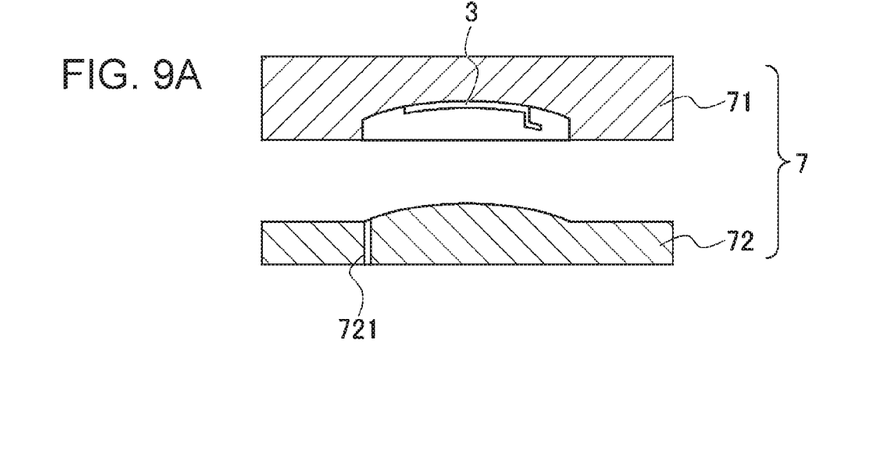
FIGS. 9A, 9B, and 9C are a cross-sectional view illustrating a first process in the input device manufacturing method according to the embodiment of the present invention.
Figure 9B:
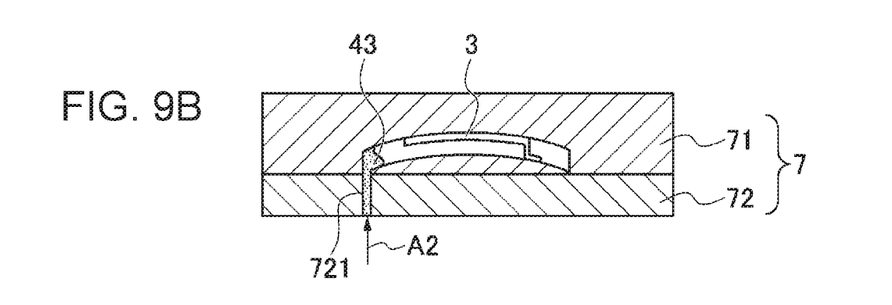
Figure 9C:
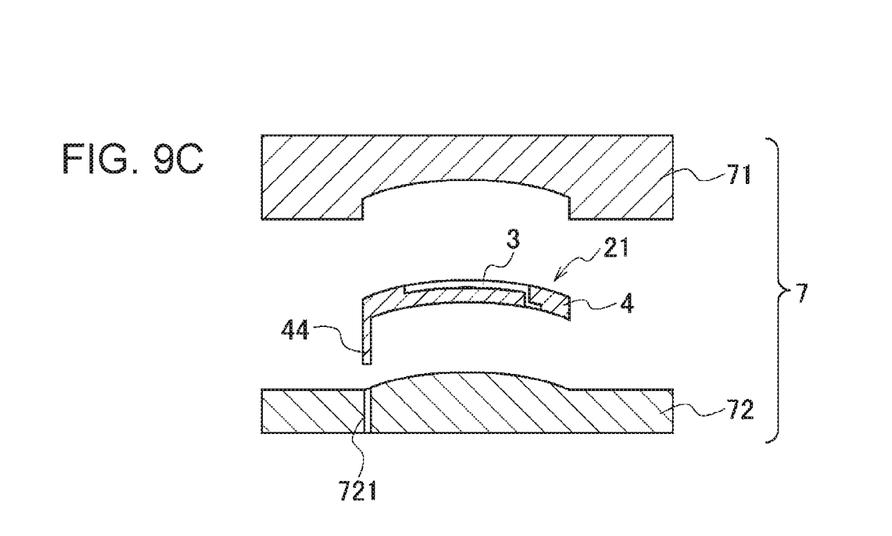
Figure 10A:
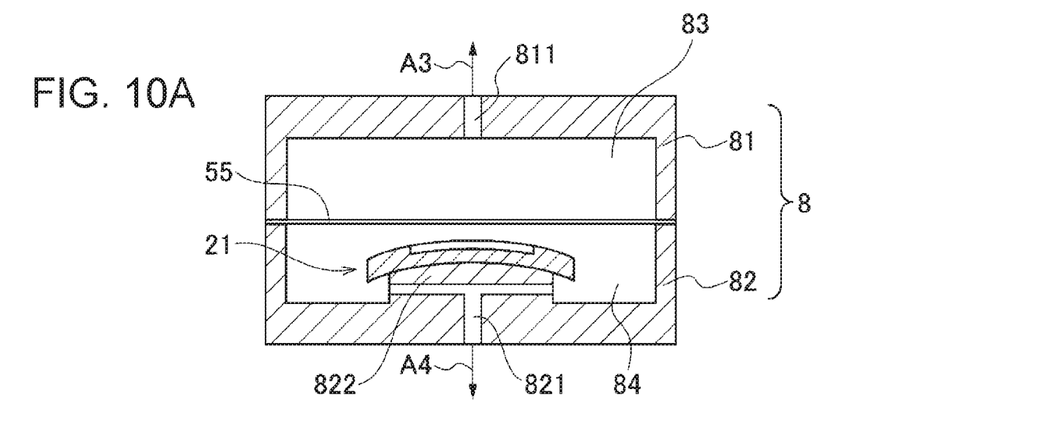
FIGS. 10A, 10B, and 10C are each a cross-sectional view illustrating a second process in the input device manufacturing method according to the embodiment of the present invention.
Figure 10B:
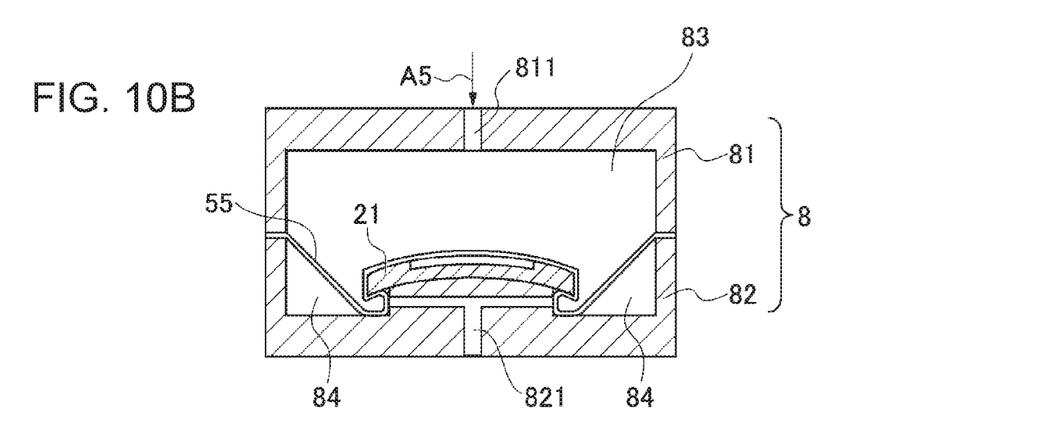
Figure 10C:
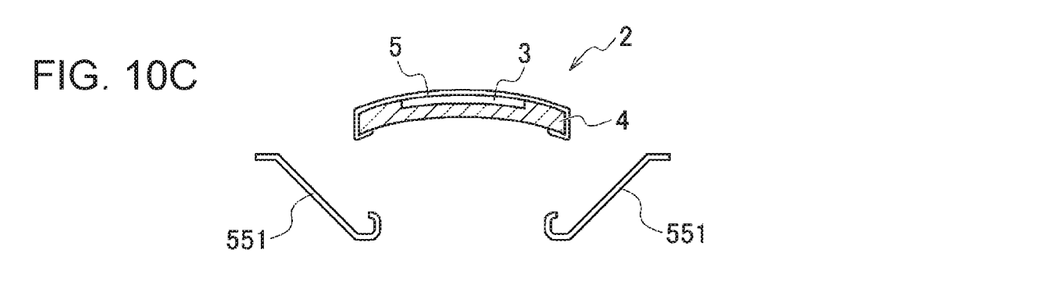

Next, a specific example of the input device manufacturing method according to this embodiment will be described with reference to the drawings. FIGS. 9A, 9B, and 9C are each a cross-sectional view illustrating the first process in the input device manufacturing method according to this embodiment. FIGS. 10A, 10B, and 10C are each a cross-sectional view illustrating a second process in the input device manufacturing method according to this embodiment.

This variation will be described by using the method, described above with reference to FIGS. 5A and 5B, of manufacturing the input device 2 as an example. Also, this variation will be described by using a case in which TOM (Three dimension Overlay Method) is used in the second process as an example.

As illustrated in FIGS. 9A to 9C, a die 7 used in the first process in the method of manufacturing the input device 2 is composed of an upper die 71 and a lower die 72. In this variation, the upper die 71 is a so-called cavity and the lower die 72 is a so-called core. In the lower die 72, a gate 721 is provided in which a material (specifically, material of the molded panel 4) 43 including a synthetic resin in a molten state.

As illustrated in FIG. 9A, the sensor film 3 is first placed in the upper die 71 in the first process. At this time, the sensor film 3 may be heated to a predetermined temperature to pre-form the sensor film 3.

Next, the upper die 71 and lower die 72 are closed and clamped, after which, as indicated by the arrow A2 in FIG.

9B, the material (specifically, material of the molded panel 4) 43 including a synthetic resin in a molten state is caused to flow into space between the upper die 71 and the lower die 72 by an injection molding machine (not illustrated). Then, the material, including a synthetic resin, that has been caused to flow into the space between the upper die 71 and the lower die 72, is cooled and solidified. Thus, the molded panel 4 is formed and the sensor film 3 is insert-molded in the molded panel 4. At this time, the edges 313 (see FIG. 5A) of the sensor film 3 are buried in the molded panel 4.

Next, as illustrated in FIG. 9C, the upper die 71 and lower die 72 are opened and the laminated body 21 is taken out. Then, an unnecessary part 44, which has been solidified in the gate 721, is removed. Thus, the laminated body 21 composed of the sensor film 3 and molded panel 4 is formed by insert molding.

As illustrated in FIGS. 10A to 10C, a pasting machine 8 used in the second process in the method of manufacturing the input device 2 has an upper chamber 81 and a lower chamber 82. In the upper chamber 81, a first flow path 811 is formed through which air in the pasting machine 8 is evacuated by a vacuum pump (not illustrated) and air at atmospheric pressure or compressed air, for example, is led into the inside of the pasting machine 8. In the lower chamber 82, a second flow path 821 is formed through which air in the pasting machine 8 is evacuated by a vacuum pump (not illustrated) and air at atmospheric pressure is led into the inside of the pasting machine 8.

As illustrated in FIG. 10A, in the second process, the laminated body 21 that has been formed in the first process is first placed on a table 822 provided in the lower chamber 82. Next, the upper chamber 81 and lower chamber 82 are closed to interpose a base material (specifically, material of the decorative film 5) 55 in a film shape between the upper chamber 81 and the lower chamber 82. An adhesive (specifically, adhesive forming the adhesive layer 6) such as, for example, an acrylic adhesive has been applied to a surface, facing the laminated body 21, of the base material 55.

At this time, first space 83 between the upper chamber 81 and the base material 55 in a film shape and second space 84 between the lower chamber 82 and the base material 55 in a film shape are in an airtight state and in an atmospheric pressure state.

Next, air in the first space 83 is caused to pass through the first flow path 811 and is evacuated to the outside of the first space 83 by a vacuum pump (not illustrated), as indicated by the arrow A3 in FIG. 10A. Also, air in the second space 84 is caused to pass through the second flow path 821 and is evacuated to the outside of the second space 84 by a vacuum pump (not illustrated), as indicated by the arrow A4 in FIG. 10A. Thus, the first space 83 and second space 84 are placed in a vacuum state. Next, the base material 55 in a film shape is heated by using a heater (not illustrated), or the like.

Next, air at atmospheric pressure is introduced into the first space 83 through the first flow path 811, as indicated by the arrow A5 in FIG. 10B. Thus, the first space 83 is placed in an atmospheric pressure state. Alternatively, compressed air may be introduced into the first space 83 through the first flow path 811. Thus, the first space 83 is placed in a pressurized state. By placing the first space 83 in the atmospheric pressure state or pressurized state in this way, the base material 55 in a film shape is brought into tight contact with the laminated body 21 and is pasted to it as illustrated in FIG. 10B. The table 822 may have been moved toward the upper chamber 81 so as to bring the laminated body 21 close to or into contact with the base material 55 in a film shape before the first space 83 is placed in the atmospheric pressure state or pressurized state.

Next, air at atmospheric pressure is introduced into the second space 84 through the second flow path 821. Thus, the second space 84 is placed in the atmospheric pressure state. Next, the upper chamber 81 and lower chamber 82 are opened and the input device 2 is taken out as illustrated in FIG. 10C. Then, an unnecessary part 551 is removed. Thus, the input device 2, in which the decorative film 5 is pasted to the first surface 311 of the sensor film 3 and the first surface 41 of the molded panel 4 with the adhesive layer 6 intervening therebetween, is formed by a three dimension overlay method.

In this variation, since a three dimension overlay method is preferably used in the second process, it is possible to increase the tight contact of the decorative film 5 with the sensor film 3 and molded panel 4, to more restrain concave and convex parts from appearing on the front surface of the input device 2, and to more improve the smoothness of the front surface of input device 2.

So far, this embodiment has been described. However, the present invention is not limited to examples in the embodiment. For example, the scope of the present invention also includes embodiments obtained as a result of adding or deleting constituent element to or from the above embodiment, performing design changes to the above embodiment, or appropriately combining features in embodiments without departing from the intended scope of the present invention; the addition, deletion, design change, or combination is effected by a person having ordinary skill in the art. Although, in the embodiment described above, an example has been described in which a decorative film is pasted to a sensor film and molded panel by using a three dimension overlay method, the method of pasting the decorative film to the sensor film and molded panel is not limited to a three dimension overlay method.

What is claimed is:

1. A method for manufacturing an input device, the method comprising:
   providing a sensor film including a detection area which forms a sensor, and a non-detection area surrounding the detection area, the sensor film having a first surface formed into a curved surface and a second surface opposite to the first surface;
   inserting the sensor film into a die;
   pouring a material that includes a synthetic resin having a translucent property into the die so as to form a resin layer facing the second surface, thereby providing a laminated body of the sensor film and the resin layer, the resin layer being larger than the sensor film and extending beyond an edge of the sensor film such that an edge of the sensor film is embedded in the resin layer, thereby forming a top main surface of the laminated body including the first surface of the sensor film, a bottom surface of the resin layer on an opposite side of the sensor film forming a bottom main surface of the laminated body; and
   attaching, after forming the resin layer, a decorative film having a decorative area to the top main surface of the laminated body with an adhesive layer intervening therebetween, such that the decorative area covers the non-detection area of the sensor film,
   wherein the sensor film is provided with a lead wire extending from the non-detection area and having a terminal part,
   and wherein in the forming of the resin layer, the lead wire extends from the top main surface across the resin layer such that the terminal part is exposed from the bottom main surface of the laminated body.

2. The method according to claim 1, wherein the decorative film is attached using a three dimension overlay method.

3. The method according to claim 1, wherein in the forming of the resin layer, the lead wire is buried in the resin layer so as to extend therethrough from the top main surface to the bottom main surface.

4. The method according to claim 3, wherein, the terminal part is exposed on and along the bottom main surface.

5. The method according to claim 1, wherein in the forming of the resin layer, the lead wire extends along a side surface of the resin layer such that the terminal part extends beyond the bottom main surface.

* * * * *